United States Patent
Birk et al.

(10) Patent No.: US 7,415,206 B1
(45) Date of Patent: Aug. 19, 2008

(54) ARRANGEMENT FOR CHARACTERIZING AND REDUCING MULTI-PATH INTERFERENCE (MPI) AND/OR OPTICAL RETURN LOSS (ORL) IN OPTICAL TRANSMISSION LINKS HAVING MULTIPLE DISCRETE REFLECTION SOURCES

(75) Inventors: Martin Birk, Belford, NJ (US); Xiang Zhou, Middletown, NJ (US)

(73) Assignee: AT&T Corp., New York, NY (US)

( * ) Notice: Subject to any disclaimer, the term of this patent is extended or adjusted under 35 U.S.C. 154(b) by 469 days.

(21) Appl. No.: 11/073,121

(22) Filed: Mar. 4, 2005

(51) Int. Cl.
   *H04B 10/08* (2006.01)

(52) U.S. Cl. .............................. 398/21; 398/25; 398/33

(58) Field of Classification Search ............. 398/21, 398/25, 28, 33, 84, 87
   See application file for complete search history.

(56) References Cited

U.S. PATENT DOCUMENTS

| | | | |
|---|---|---|---|
| 5,999,258 A * | 12/1999 | Roberts | 356/450 |
| 6,084,704 A * | 7/2000 | Button et al. | 359/337 |
| 6,580,498 B1 * | 6/2003 | Harley | 356/73.1 |
| 2003/0011876 A1 | 1/2003 | Fidric | |
| 2003/0235360 A1 | 12/2003 | Mozdy et al. | |
| 2004/0032593 A1 * | 2/2004 | Venugopal | 356/504 |
| 2004/0120641 A1 | 6/2004 | Machewirth et al. | |
| 2004/0208503 A1 | 10/2004 | Shieh | |
| 2005/0036788 A1 * | 2/2005 | Matsuoka et al. | 398/81 |

* cited by examiner

*Primary Examiner*—Dalzid Singh

(57) ABSTRACT

In an optical transmission link having discrete optical reflection sources that cause multi path interference (MPI) and optical return loss (ORL), a method determines how to reduce to beneath a predetermined threshold, a predetermined phenomenon (MPI or ORL or a composite of the two). The method involves (408/428/458) measuring link parameters of the optical transmission link using an optical reflectometry technique, (410/430/460) calculating a level of the predetermined phenomenon based on the link parameters, and (416/436/466) simulating replacement of a number of the reflection sources until the calculated level of the predetermined phenomenon is reduced to less than the predetermined threshold. The method may be performed within a portable optical reflectometry device to facilitate field simulations.

19 Claims, 6 Drawing Sheets

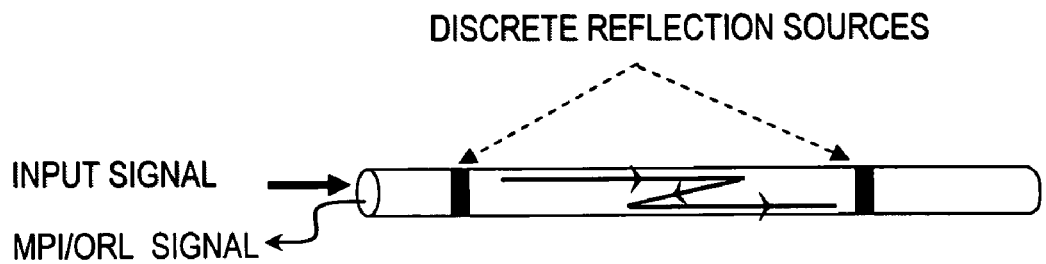
FIG. 1A

FIG. 1C
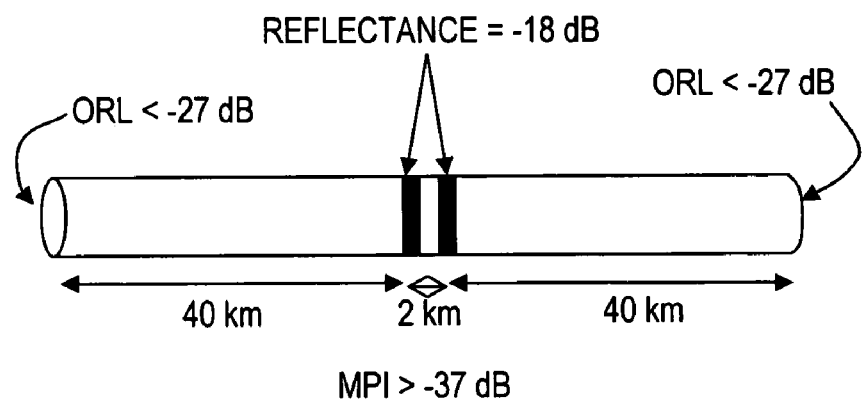
FIG. 2

ARRANGEMENT FOR CHARACTERIZING AND REDUCING MULTI-PATH INTERFERENCE (MPI) AND/OR OPTICAL RETURN LOSS (ORL) IN OPTICAL TRANSMISSION LINKS HAVING MULTIPLE DISCRETE REFLECTION SOURCES

BACKGROUND OF THE INVENTION

1. Field of the Invention

The invention relates to arrangements for characterizing and reducing multi-path interference (MPI) and/or optical return loss (ORL). More specifically, the invention relates to arrangements, especially portable arrangements, for characterizing and reducing MPI and/or ORL in optical transmission links having a single or multiple discrete reflection sources.

2. Related Art

In many optical fiber transmission links, not only is there continuous reflection from the fiber itself, but there are also reflections from discrete reflection sources (see FIG. 1A) such as connectors, mechanical splices or "bad" (reflective) fusion splices. See L. A. Reith, "Issue relating to the performance of optical connectors and splices," *Proc. SPIE*, Vol. 1972, pp. 294-305, 1996. Reflections from these discrete reflection sources may degrade the performance of an optical communication system considerably through multi-path interference (MPI). See J. Boromage, and L. E. Nelson, "Relative impact of multi-path interference and amplified spontaneous emission noise on optical receiver performance," *OFC* 2002, paper TuR3. See also U.S. Patent Application Publication No. 2004/0120641 (Machewirth et al.).

In the context of optical fibers having discrete reflection sources, optical return loss (ORL) may be defined as a ratio (usually expressed in dB) of optical power reflected back from an interface and the optical power arriving at the interface. In contrast, MPI may be defined as a relatively complex propagation phenomenon that results in optical signals reaching a receiving device by multiple paths, such as by reflection from the multiple discrete reflection sources. MPI's effects include constructive and destructive interference that potentially are extremely complex.

Because the MPI signal co-propagates with the original signal (see FIGS. 1B, 1C) and may also have the same spectral structure as the original signal, direct measurement of MPI in the field is much more difficult than measurement of ORL. As a result, commonly, only ORL has been measured in the field; the level of MPI is merely estimated, based on the ORL measurement.

According to Telecordia's standard, ORL less than −27 dB is thought to be low enough that its impact of reflection on the optical communication system is negligible. However, recent investigations have revealed that even if the ORL is smaller than −27 dB, MPI can be severe if there are strong discrete reflections in the optical transmission link. For example, as shown in FIG. 2, if there are two strong (−18 dB) discrete reflection sources located 2 km apart and near the middle of an 80 km optical transmission span, the level of MPI can exceed −37 dB. This high MPI level is experienced even in purely EDFA-amplified optical communication systems, which give minimal MPI compared to EDFA/Raman hybrid system and all-Raman systems (assuming the same optical transmission link parameters).

However, an MPI of less than −40 dB per 80 km span is usually required for new generation ultra-long haul (ULH) wavelength division multiplexing (WDM) systems. Thus, even for purely EDFA-amplified systems, the level of MPI can be excessive even when ORL is within acceptable limits.

FIGS. 3A and 3B illustrate the relationship between ORL and MPI for respective fiber links. FIG. 3A illustrates the ORL-MPI relationship without multiple discrete reflection sources, and FIG. 3B illustrates the ORL-MPI relationship with such sources, for a purely EDFA system. FIG. 3A shows a deterministic relationship between ORL and MPI for a fiber link without discrete reflection sources: when ORL is smaller than −27 dB, the level of MPI is lower than −45 dB. This MPI value is beneath the −40 dB MPI threshold mentioned above for 80 km spans.

However, in the scenario of special interest here, a fiber link with multiple discrete reflections, FIG. 3B shows that the correlation between ORL and MPI is very weak. Thus, significantly, a small ORL doesn't necessarily imply a small MPI. New generation ULH transport WDM systems (with transmission distances exceeding 1500 km) impose much more stringent MPI requirements on the fiber link than old transport systems (with typical transmission distances less than 600 km). Accordingly, there is an urgent need to be able to characterize and reduce MPI.

Furthermore, if the level of MPI exceeds an allowed maximum level, the reduction of MPI to an acceptable level must be achieved at minimal cost. Traditionally, a field technician has been sent to visit almost all the discrete reflection sources for repair or replacement. Clearly, this traditional approach is very time consuming and expensive. Accordingly, there is also an urgent need in the art to reduce MPI to acceptable levels in a cost-efficient manner.

To better characterize a fiber link's MPI performance, two approaches for direct measurement of the level of MPI have been proposed and demonstrated.

The first approach is called the electrical method. See Chris R. S. Fludger and Robert J. Mears, "Electrical measurement of multipath interference in distributed Raman amplifiers," *J. Lightwave Technology*, Vol. 19, no. 4, pp. 536-545, 2001. For this method, a continuous wave (CW) optical signal is fed into the fiber link at a transmitter, and the optical signal is then converted into an electrical signal at a receiver. An electrical spectrum analyzer determines the MPI level by analyzing the electrical spectra.

The second approach of direct MPI measurement is called the optical method. S. A. E. Lewis, S. V. Chemikov and J. R. Taylor, "Characterization of double Rayleigh scatter noise in Raman amplifier," *IEEE Photonics Technology Lett.*, Vol. 12, pp. 528-530, 2000. In this method, an input optical signal is modulated by a very high extinction ratio (>50 dB) optical modulator. At a receiver, the MPI signal is extracted from the original optical signal through another synchronized optical modulator that also has a very high extinction ratio. While the electrical method may be field applicable, the optical method is more suitable for laboratory applications due to the need of synchronization between the transmitter and the receiver.

Neither the electrical method nor the optical method deal with the problem of turning a fiber link with unacceptably high MPI into a link with acceptable level of MPI, especially doing so at minimal cost.

Other approaches to locating faults in optical fibers include coupling a second fiber to a fiber to be examined, and measuring the optical signal reflected from a far end of the second fiber; see U.S. Patent Application Publication No. 2004/0208503 (Shieh). Also, U.S. Pat. No. 5,999,258 (Roberts) discloses an MPI measurement system that analyzes transmitted light rather than reflected light.

Still other artisans have provided approaches to reduce existing MPI. U.S. Patent Application Publication No. 2003/

0235360 (Mozdy et al.) discloses a method of reducing MPI by providing an optical pump that pumps a dispersion compensating optical waveguide with light. U.S. Patent Application Publication No. 2003/0011876 (Fidric) discloses an amplifier system in which an optical amplifier between two amplifier stages is by-passed so as to avoid introduction of MPI. However, especially in long haul fibers, reducing MPI is not as effective as altogether removing the sources of the MPI in the first place.

Unfortunately, the foregoing approaches do not effectively solve the problem of analyzing a given transmission system to facilitate reduction of MPI to below a given threshold, especially at minimal cost. Thus, there is a need in the art for cost-effectively characterizing and reducing MPI in optical transmission links having multiple discrete reflection sources.

SUMMARY

In an optical transmission link having discrete optical reflection sources that cause multi path interference (MPI) and optical return loss (ORL), a method determines how to reduce to beneath a predetermined threshold, a predetermined phenomenon (MPI or ORL or a composite of the two). The method involves measuring link parameters of the optical transmission link using an optical reflectometry technique, calculating a level of the predetermined phenomenon based on the link parameters, and simulating replacement of a number of the reflection sources until the calculated level of the predetermined phenomenon is reduced to less than the predetermined threshold. The method may be performed within a portable optical reflectometry device to facilitate field simulations.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which:

FIGS. 1A, 1B and 1C (collectively, "FIG. 1") illustrate multi-path interference (MPI) and optical return loss (ORL);

FIG. 2 illustrates the weak correlation between ORL and MPI for a fiber link having large discrete reflection resources;

FIG. 3A shows the ORL-MPI relationship in a fiber link without discrete continuous reflection sources and FIG. 3B shows the ORL-MPI relationship in a fiber link with multiple discrete reflection sources (the reflectance of each discrete reflection sources is assumed to be normal distributed with an average of −38 dB and standard deviation of 6 dB; a purely EDFA system and standard single mode fiber (SSMF) with fiber loss of 0.25 dB/km are assumed);

FIG. 4A illustrates a method of characterizing and reducing MPI in optical transmission links having multiple discrete reflection sources;

FIG. 4B illustrates a method of characterizing and reducing ORL in optical transmission links having multiple discrete reflection sources;

FIG. 4C illustrates a method of characterizing and reducing composite MPI and ORL in optical transmission links having multiple discrete reflection sources;

DETAILED DESCRIPTION

Figure 1B:
Figure 3A:
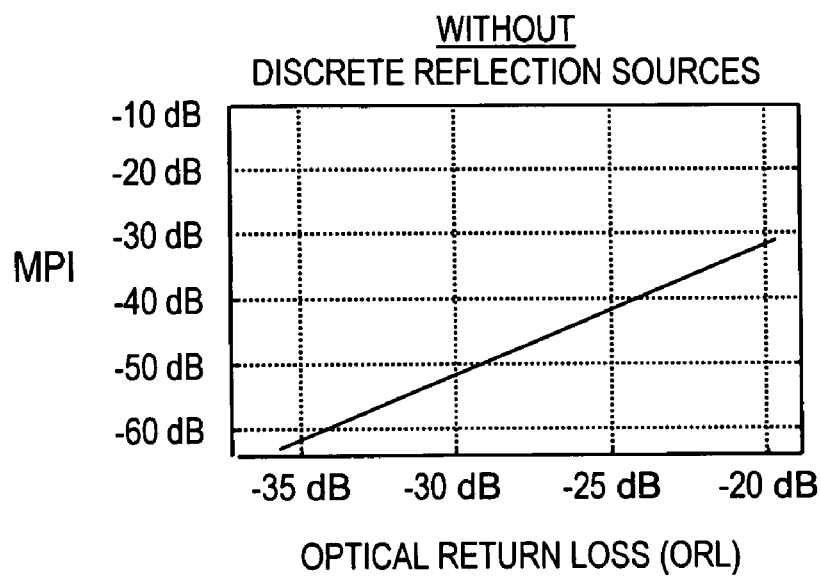
FIGS. 3A and 3B (collectively, "FIG. 3") show the relationship between ORL and MPI in two scenarios.
Figure 3B:
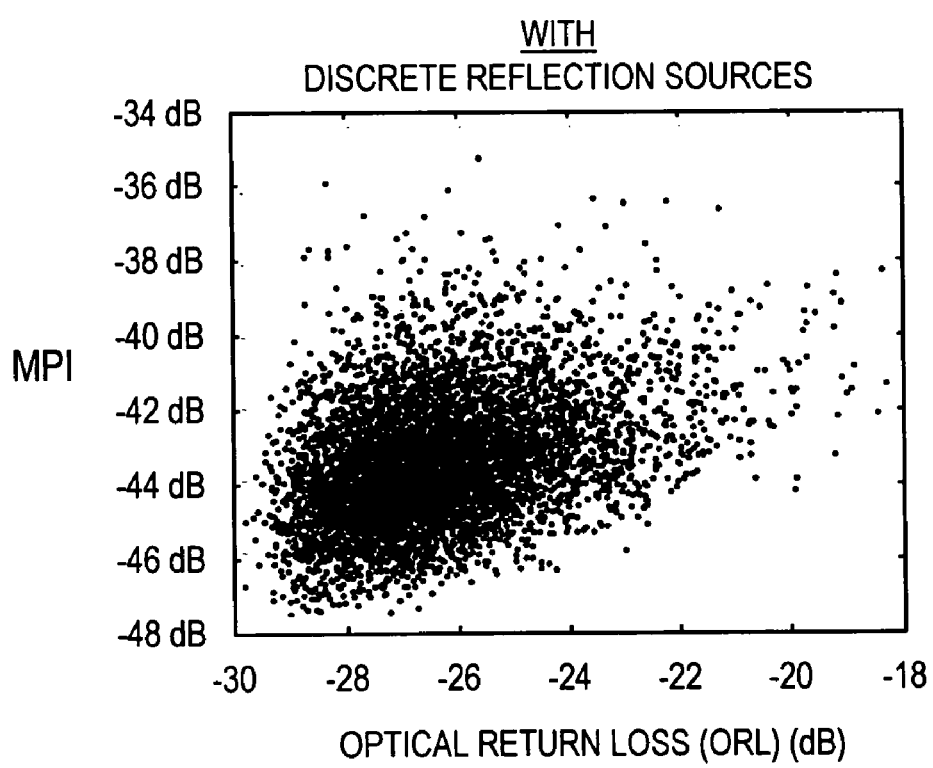

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, the selection, construction and/or use of elements employed in optical communications (such as repeaters, couplers, switches, wavelength blocking elements, terminals, and the like) are readily accomplished by those skilled in the art, and thus their details may be omitted. Also, common network communications techniques and network management techniques, such as optical time domain reflectometry (OTDR) may be only briefly mentioned or illustrated, their details being well known by skilled artisans. Thus, the steps involved in methods described herein may be readily implemented by those skilled in the art without undue experimentation.

Further, various aspects, features and embodiments of the arrangement may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

This invention solves at least the problems discussed in the Background in a very time- and cost-effective way. The principles described herein are applicable to both MPI and ORL characterization and reduction.

Generally speaking (for example, see Alliance for Telecommunications Solutions website definition), optical time domain reflectometry (OTDR) involves use of an opto-electronic instrument to characterize an optical fiber by injecting optical pulses into a fiber and extracting reflected light. The intensity of the return pulses is measured and integrated as a function of time, and may be plotted as a function of fiber length. OTDR-based techniques have traditionally been used to estimate a fiber's overall attenuation, including splice and mated-connector losses, and to measure splice reflectivity or locate faults such as fiber breaks.

In the present context of optical fibers with discrete reflection sources, the inventors have extended OTDR for use in isolating the location of the reflection sources, and in determining the reflection sources' respective quantitative effects on MPI and ORL.

Figure 4A:
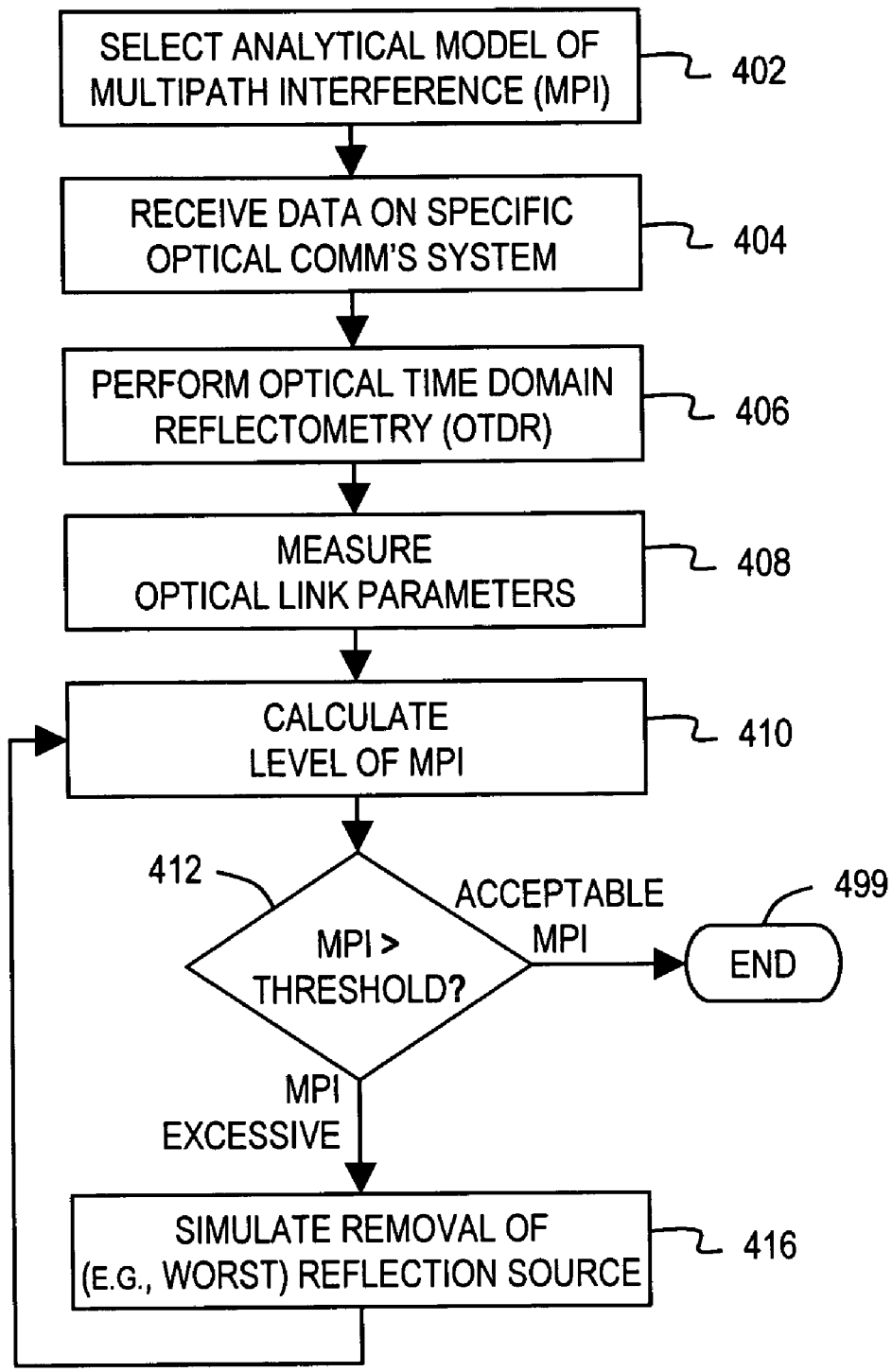
FIGS. 4A, 4B, 4C (collectively, "FIG. 4") are flowcharts illustrating embodiments of methods according to the present invention, in particular.
Figure 4B:
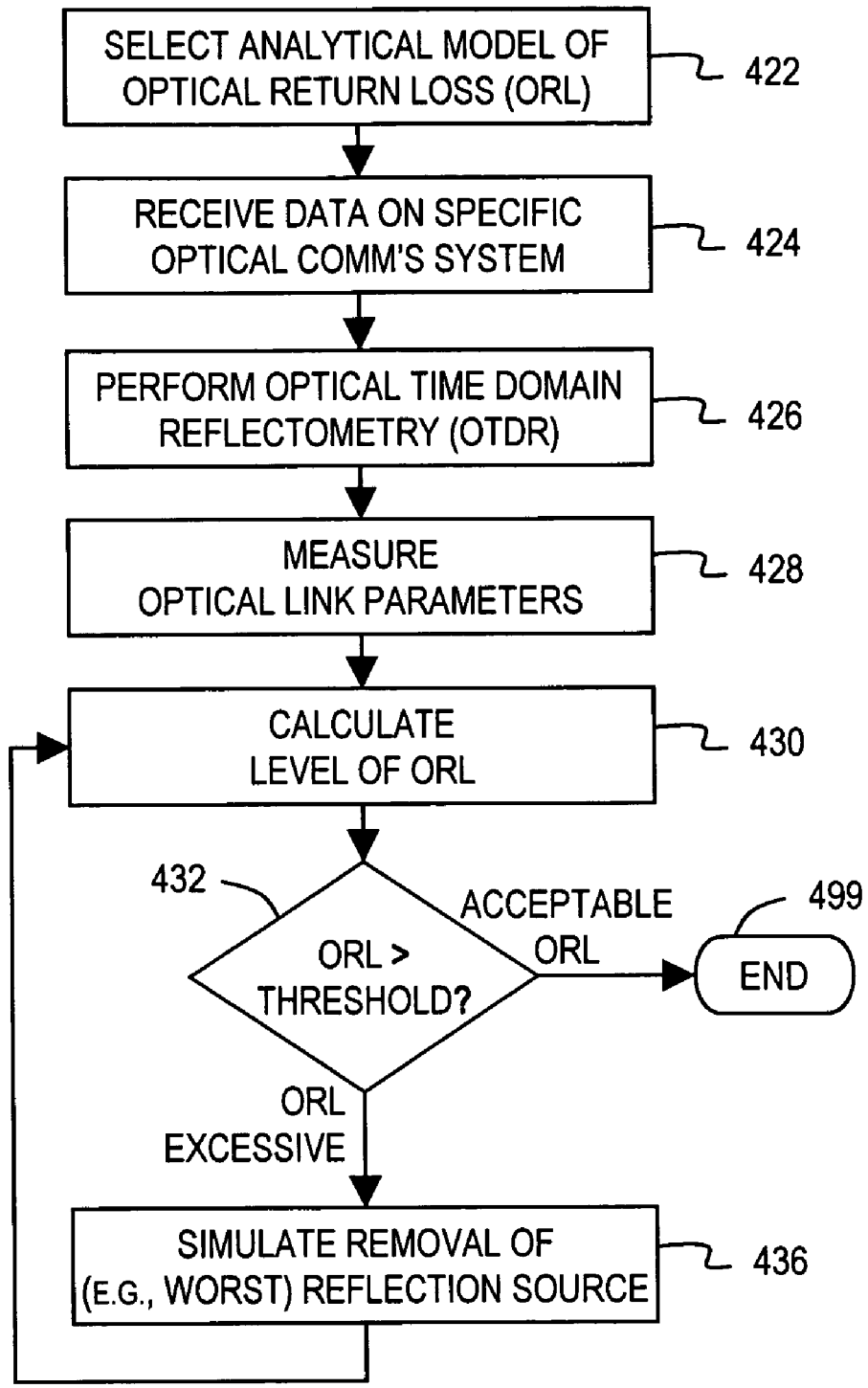
Figure 4C:
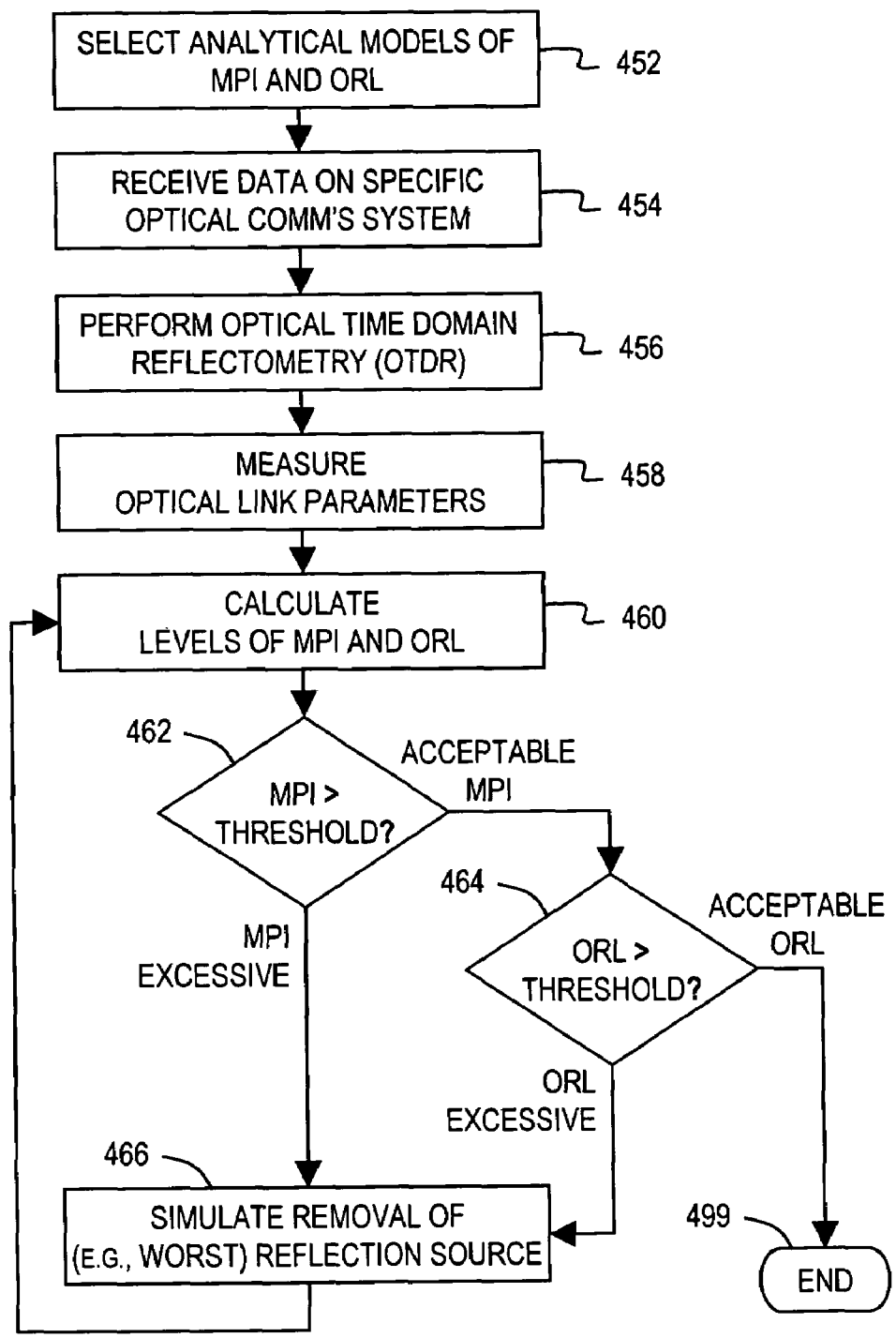

FIGS. 4A, 4B, 4C (collectively, "FIG. 4") are flowcharts illustrating embodiments of methods according to the present invention. In particular, FIG. 4A illustrates a method of characterizing and reducing MPI in optical transmission links having multiple discrete reflection sources.

Referring to FIG. 4A, block 402 indicates a selection of an analytical model of MPI. According to one analytical model, then the level of MPI may be given by:

$$MPI \cong \underbrace{\gamma \int_0^L \int_z^L G^2(z, z') dz' dz}_{Rayleigh-Rayleigh} + \underbrace{\sum_{k=0}^N \gamma[a_k F^+(k) + a_k F^-(k)]}_{Rayleigh-Discrete} + \tag{Equation 1}$$

$$\underbrace{\sum_{k_1=0 k_2}^N \sum_{k_1=1}^N a_{k1} a_{k2} G^2(d_{k1}, d_{k2})}_{Discrete-Discrete}$$

in which:

$$F^+(k) = \int_0^{d_k} G^2(z, d_k) dz \tag{Equation 2a}$$

$$F^-(k) = \int_{d_k}^L G^2(d_k, z) dz \tag{Equation 2b}$$

$$G(z, z') = \frac{S(z')}{S(z)} \tag{Equation 3}$$

and in which:
MPI denotes a calculated level of multi-path interference,
$\gamma$ denotes the Rayleigh backscattering coefficient of the fiber,
z is the longitudinal dimension down the fiber,
z' denotes distance along the longitudinal dimension down the fiber,
L denotes the length of the fiber link,
N is the number of discrete reflection sources,
S(z) denotes the longitudinal signal power profile along the z-axis,
$a_k$ denotes the reflectance of the k-th reflection sources (along the z-axis),
$d_k$ denotes the position of the k-th reflection sources (along the z-axis), respectively.

Of course, this is just one example of an MPI analytical model. Other models may be chosen by those skilled in the art while remaining within the scope of the present invention.

Referring again to FIG. 4A, block 404 indicates the input of data on a specific optical communications system that is under study. Such data may include, for example:
the length of the optical fiber link
total loss of the fiber
fiber type
other pertinent data
Such measurements may be made on optical signals at one wavelength, or at plural wavelengths concurrently.

Block 406 indicates the performance of optical time domain reflectometry (OTDR) on the system under study. OTDR may involve injecting a sequence of optical pulses or other optical signals into the fiber, and measuring reflected optical energy as a function of time.

Block 408 indicates the measurement of optical link parameters. Based on the OTDR techniques of block 406, basic optical transmission link parameters may be measured or calculated. Such parameters may include:
continuous fiber loss
discrete splice/connector loss
respective locations and magnitudes of discrete reflectance sources
locations of the discrete reflectance sources along the link
other relevant parameters
Such measurements may be made on optical signals at one wavelength, or at plural wavelengths concurrently.

Block 410 indicates the calculation of the level of MPI based on the analytical MPI model (block 402), the current set of communication system data (block 404) and link parameters (408). The analytical model may be used to calculate the level of MPI for specific types of optical communication system. For example, a purely EDFA system, a EDFA/Raman Hybrid system, an all-Raman system, and so forth, may be chosen system types.

Block 412 indicates the comparison of the calculated MPI level to a threshold MPI value (for example, −40 dB). If the calculated level of MPI is acceptable, control passes to block 499, marking the end of execution. However, if the calculated level of MPI is greater than the allowable maximum level, control passes to block 416.

Block 416 indicates an optimizing method that specifically identifies a smallest set (or least-expensive-to-repair set, etc.) of discrete reflection sources to repair, in order to reduce MPI to an acceptable level.

In one embodiment, the optimizing method may simply involve simulating the removal of the reflectance source that has the highest calculated contribution to MPI. This optimizing method may be based on the analytical model described with reference to block 402. However, the invention also envisions alternative methods that may consider such factors as the differing relative costs of physical repair or replacement of different real-world reflection sources.

The simulated removal of the most offending reflectance source effectively modifies the optical link parameters that were originally measured or calculated in block 408. After block 416 is executed, control passes back to block 410 for calculation of a new MPI value, this time based on the modified optical link parameters.

A loop involving blocks 410, 412, and 416 is repeated as long as the MPI level exceeds the threshold of acceptability used in decision block 412. With each iteration of the loop, a most offending discrete reflectance source then remaining in the optical link parameters is removed, and the level of MPI is correspondingly reduced. This method causes the MPI to shrink to an acceptably low level with (generally) the fewest iterations of loop 410, 412, 416. Because the loop includes a simulated removal 416 of a discrete reflection source, ensuring the fewest iterations of the loop ensures a minimal number of physical repairs in the real world, a desirable cost-minimizing feature.

FIG. 4B illustrates a method of characterizing and reducing ORL in optical transmission links having multiple discrete reflection sources. Blocks 422, 424, 426, 428, 430, 432, 436, 499 in FIG. 4B generally correspond to blocks 402, 404, 406, 408, 410, 412, 416, 499 in FIG. 4A, respectively, except that the figure of interest is ORL (FIG. 4B) rather than MPI (FIG.

4A). Accordingly, an exhaustive description of the blocks of FIG. 4B is not required and is omitted for brevity.

However, the model of ORL is different than that for MPI. One ORL model may be given by:

$$ORL \cong \gamma \int_0^L G^2(0, z) dz + \sum_{k=0}^N a_k G^2(0, d_k) \quad \text{(Equation 4)}$$

in which the parameters are defined the same as for the MPI model (equations 1, 2a, 2b, 3, above).

In any event, the method of FIG. 4B strategically removes sources of ORL in an efficient manner, in a sequence based on the degrees to which respective discrete reflection sources contribute to overall ORL.

FIG. 4C illustrates a method of characterizing and reducing a composite MPI and ORL in optical transmission links having multiple discrete reflection sources. Blocks 452, 454, 456, 458, 460, 462+464, 466, 499 in FIG. 4C generally correspond to blocks 402/422, 404/424, 406/426, 408/428, 410/430, 412/432, 416/436, 499 in FIGS. 4A/4B, respectively. For example, the models of MPI and ORL in block 452 may be the same as those individually chosen in blocks 402 and 422. However, in FIG. 4C the figure of interest is the discrete reflection sources' respective contribution to a composite MPI+ORL value, rather than MPI (FIG. 4A) or ORL (FIG. 4B) individually. Accordingly, an exhaustive description of the blocks of FIG. 4B is not required and is omitted for brevity.

However, decision blocks 412 (FIG. 4A) and 432 (FIG. 4B) are replaced in FIG. 4C by a sequence of two decision blocks 462 and 464. Decision block 462 compares a level of MPI (calculated in block 460) to an MPI threshold. Decision block 464 compares a level of ORL (calculated in block 460) to an ORL threshold. If either threshold is violated, then control passes to block 466 for simulated removal of a discrete reflection source that is calculated to contribute most significantly to the composite level of MPI and ORL. However, if both calculated MPI and ORL levels are beneath acceptable thresholds, then control passes to 499, indicating completion of execution.

Block 466 decides which discrete reflection source, currently remaining in the optical link parameters after any previous iterations of loop 460, 462, 464, 466, that is calculated to contribute most significantly to the composite level of MPI and ORL. This decision is based on a suitable approach to allocating how much each separate MPI and ORL measurement contributes to the composite MPI+ORL level. In a simple approach, a 50%-50% allocation is adopted.

In an alternative approach, the MPI and ORL contributions to the composite MPI+ORL level are directly proportional to the degree to which each individual level exceeds its threshold. For example, in this alternative approach, if MPI exceeds its threshold by 3 dB and ORL exceeds its threshold by 2 dB, then the composite MPI+ORL value constitutes 0.6*MPI+ 0.4*ORL. Here, 0.6=3/(3+2) and 0.4=2/(3+2). In this event, the method simulates removal of the reflection source having the largest value under this formula.

Of course, other methods of weighting MPI and ORL values to arrive at a composite MPI+ORL value lie within the scope of the present invention. The method of FIG. 4C strategically removes sources of composite MPI+ORL in an efficient manner, in a sequence based on the degrees to which respective discrete reflection sources contribute to overall composite MPI+ORL.

Figure 5:
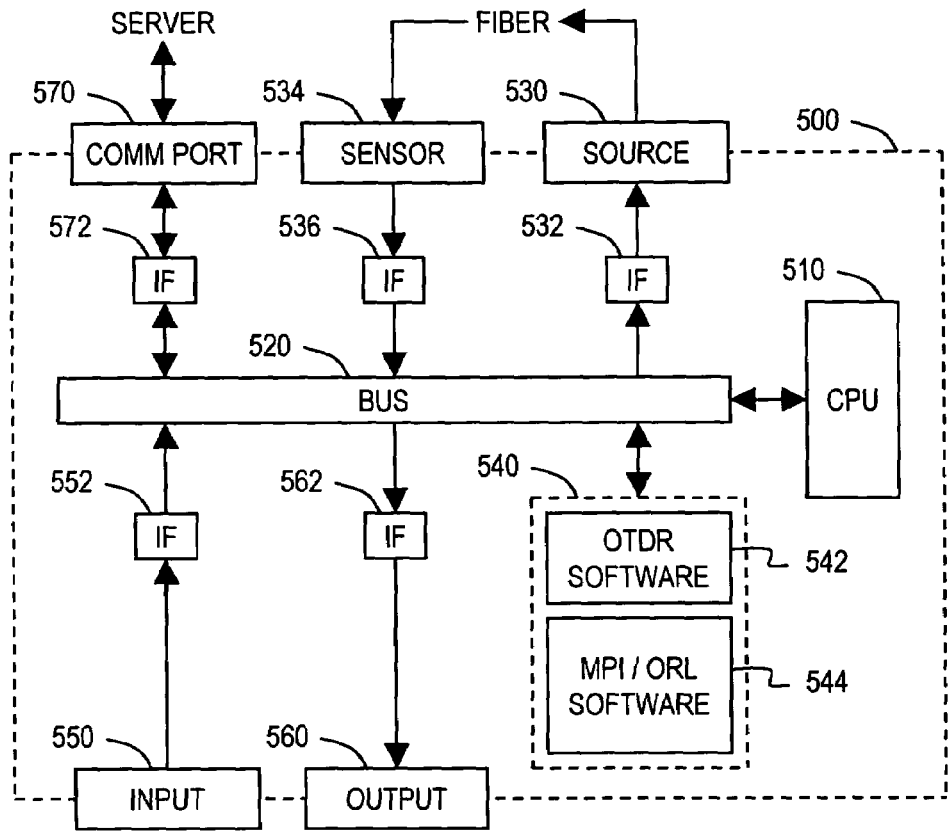
FIG. 5 is a schematic diagram illustrating one embodiment of an apparatus, especially a portable device, for characterizing and reducing MPI and/or ORL in optical transmission links having multiple discrete reflection sources.

The methods, including analytical models for MPI and ORL, that are described herein may be implemented in portable OTDR devices (see, for example, FIG. 5). Portable OTDR devices are already widely used in the field to measure certain basic optical link parameters. However, by adding programmed software functions according to the present disclosure, the resulting device not only can characterize MPI and ORL, but also specifically identify the fewest discrete reflection sources to repair or replace, in order to reduce MPI, ORL, or MPI+ORL, to acceptable levels.

Alternatively, the analytical model may be implemented in a standalone device such as a web accessible computer server. Such servers may be implemented on any suitable general purpose computer, whose structure and operation are known to those skilled in the art and thus do not require separate illustration.

FIG. 5 is a schematic diagram illustrating one embodiment of an apparatus 500, which may constitute an enhanced portable OTDR device, for characterizing and reducing MPI and/or ORL in optical transmission links having multiple discrete reflection sources. In FIG. 5, a central processing unit (CPU) 510 governs operation of apparatus or device 500 through a bus 520, which includes appropriate address, data, and control buses.

Bus 520 is connected to a memory 540 that stores a variety of data and coded program instructions. More specifically, memory 540 may store OTDR software 542 and MPI/ORL software 544. Memory 540 may also store software such as operating systems, utilities, other application software, and the like. OTDR software 542 may be conventional, but the MPI/ORL software 544 is implemented according to the teachings of the present disclosure.

FIG. 5 is intended to be very schematic in nature, and may be interpreted as indicating that memory 540 may be a memory device such as one or more of a magnetic disk drive, RAM, flash memory, and the like. However, it is understood that memory element 540 is to be interpreted broadly, and that software 542 and 544 may be located in distinct physical memories, in the same physical memory, distributed in a complex manner that a particular device architecture may require, and so forth. In one important embodiment, FIG. 5 does illustrate that the inventive MPI/ORL software 544 may reside in an otherwise conventional OTDR portable device.

Device 500 sends a sequence of pulses onto an optical fiber using an optical source 530, and reflected optical energy is received from the fiber by a sensor 534. Based on the reflected optical energy profile as a function of time, CPU 510 executes the programmed instructions in the OTDR software 542 and MPI/ORL software 544 that have been explained in the methods described above.

CPU 510 also supervises control of other inputs and outputs in the device. For example, the CPU sends information or other local output to one or more output elements 560, which may include one or more of an LCD screen, audible prompt, and the like. Such output elements allow a user to monitor operation of the device and view the results of its calculations.

The user may operate device 500 using one or more local input elements 550, which may include one or more of a keyboard, mouse, trackball, tablet, microphone, and the like. Typically, the input device is used to instruct the device 500 to perform its OTDR, MPI, ORL, and/or MPI+ORL functions.

To supplement local I/O capability, a longer-distance bidirectional communications (comm) port 570 may be provided, to allow device 500 to communicate with external entities, such as servers which may be remote from the fiber test site. Comm port 570 is especially useful when device 500 is a portable device such as an OTDR box, and when raw data, processed data, or calculation results must be communicated to a central office or laboratory server. Of course, if device 500 is itself such a server, such a comm port may not be needed.

Optical source 530, sensor 534, comm port 570, local input element 550, and local output element 560 are connected to bus 520 by suitable interfaces (IFs) 532, 536, 572, 552, and 562, respectively. Such elements and interfaces may individually be conventional in nature, and their implementation and use lie within the ability of those skilled in the art.

Other elements common in the art, such as DMA controllers, cache memories, and the like, may of course be employed in device 500, but are omitted from FIG. 5 as not being essential to MPI and ORL characterization and reduction.

Device 500 may be a portable device such as a specially programmed OTDR device, or it may be a more general purpose device such as a server or other computer. The disclosed methods may be executed by any appropriate general and/or special purpose processors and/or computer systems employing technology known by those skilled in the art to be appropriate to the functions performed. Appropriate software can readily be prepared by programmers based on the present teachings, using suitable programming languages operating with appropriate operating systems. Generally, such computers include at least one bus (including address, data, control) that connects various elements, including a processor for executing program instructions, memory for holding the program instructions and other data, disks and other storage devices for storing the program instructions and other information, computer readable media storing the program instructions, input and output devices, as well as various other elements such as ASICs, GALs, FPGAs, drivers, accelerators, DMA controllers, and the like. Such computer readable media constitute a computer program product including computer executable code or computer executable instructions that, when executed, causes the computer to perform the methods disclosed herein. Examples of computer readable media include hard disks, floppy disks, compact discs, DVDs, tape, magneto optical disks, PROMs (for example, EPROM, EEPROM, Flash EPROM), DRAM, SRAM, SDRAM, RDRAM, and the like.

Figure 6:
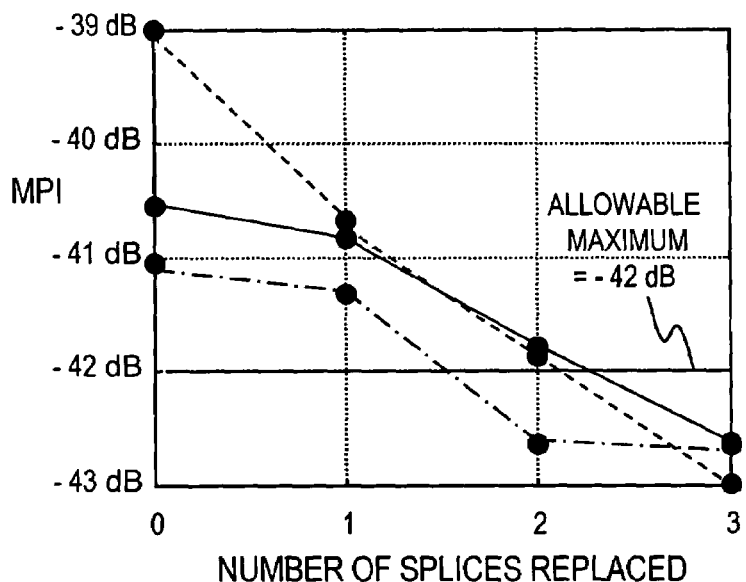
FIG. 6 shows an application of one embodiment to three fiber links in the same route for a purely EDFA system, in which each fiber has 22 mechanical splices.

FIG. 6 shows experimental results achieved when applying one embodiment to three fiber links, each fiber link having 22 discrete reflection sources due to mechanical splices, each along the same route, for a purely EDFA system. FIG. 6 shows the calculated MPI as a function of the number of mechanical splices that are replaced by "good" (non-reflective) fusion splices. In each of the three example fibers of FIG. 6, only three of 22 reflection sources required repair or replacement, to enable the fiber links to have an acceptable level (e.g. smaller than −42 dB) of MPI. Thus, the present disclosed arrangement provides arrangements for cost-effectively characterizing and reducing MPI and ORL in optical transmission links having multiple discrete reflection sources.

From the foregoing, it will be apparent to those skilled in the art that a variety of methods, systems, computer programs on recording media, and the like, are provided.

The foregoing description provides support for a method (FIG. 4), for use with an optical transmission link having discrete optical reflection sources that cause multi path interference (MPI) and optical return loss (ORL). The method involves determining how to reduce to beneath a predetermined threshold, a predetermined phenomenon that is chosen from a group consisting essentially of the MPI, the ORL, and a composite of the MPI and the ORL phenomena. More specifically, the method may involve (408/428/458) measuring link parameters of the optical transmission link using an optical reflectometry technique; (410/430/460) calculating a level of the predetermined phenomenon, based on the link parameters; and (416/436/466) simulating replacement of a number of the reflection sources until the calculated level of the predetermined phenomenon is reduced to less than the predetermined threshold.

The predetermined phenomenon may MPI, ORL, or a composite of the MPI and ORL phenomena.

The method may further involve (406/426/456) using an optical time domain reflectometry (OTDR) technique to allow the measuring step to measure the link parameters.

The simulating and calculating steps may involve (416/436/466) simulating removal of exactly one remaining reflection source that is calculated to contribute most to the level of the predetermined phenomenon, so as to update the link parameters; (410/430/460) re calculating the level of the predetermined phenomenon based on the updated link parameters; and iteratively repeating the simulating and re-calculating steps until (412/432/462,464) the level of the predetermined phenomenon is reduced to beneath the predetermined threshold.

The method may also involve (402/422/452) selecting an analytical model of the predetermined phenomenon, for use in the measuring and calculating steps.

The simulating step may involve simulating the replacement of the number of the reflection sources at a single wavelength, or at plural wavelengths.

The present disclosure supports a device (FIG. 5) for determining how to reduce, to beneath a predetermined threshold, a predetermined phenomenon that is chosen from a group consisting essentially of multi path interference (MPI), optical return loss (ORL), and a composite of MPI and ORL phenomena, that may be experienced in an optical transmission link having discrete optical reflection sources that cause the MPI and ORL. The device may have a sensing portion (534) configured to receive signals derived from reflected optical signals extracted from the optical transmission link, a processing portion (510), and a storage portion (540). The storage portion may be configured to store a first storage sub-portion (542) configured to store coded instructions that, when executed by the processing portion, perform an optical reflectometry technique on the signals from the sensing portion, and a second storage sub-portion (544) configured to store coded instructions that, when executed by the processing portion, perform a method of determining how to reduce the predetermined phenomenon to beneath the predetermined threshold.

The predetermined phenomenon may be MPI, ORL, or a composite MPI and ORL phenomena.

The sensing portion, processing portion, and storage portion may all be contained within a portable optical time domain reflectometry (OTDR) device (500).

The device may further include at least one of a group consisting essentially of a source (530) of optical signals that are injected into the optical transmission link, an input portion (550) configured to receive inputs from a user of the portable OTDR device, an output portion (560) configured to provide outputs to the user of the portable OTDR device; and a communications port (570) configured to provide bidirectional communications between the OTDR device and an external apparatus.

The sensing portion, processing portion, and storage portion may all be contained within a general purpose computer (500).

The foregoing description further supports systems configured to perform the methods described above.

The foregoing description further supports computer program products including computer executable code or computer executable instructions that, when executed, causes a computer to perform the methods described herein.

Many alternatives, modifications, and variations will be apparent to those skilled in the art in light of the above teachings. For example, the number and relative location and interconnection of elements may be varied while remaining within the scope of the present invention. Likewise, the steps involved in methods described herein may be implemented in a manner different than as described above. It is therefore to be understood that within the scope of the appended claims and their equivalents, the invention may be practiced otherwise than as specifically described herein.

What is claimed is:

1. In an optical transmission link having discrete optical reflection sources that cause multi path interference (MPI) and optical return loss (ORL), a method of determining how to reduce to beneath a predetermined threshold, a predetermined phenomenon that is chosen from a group consisting essentially of the MPI, the ORL, and a composite of the MPI and the ORL phenomena, the method comprising:

measuring link parameters of the optical transmission link using an optical reflectometry technique;

calculating a level of the predetermined phenomenon, based on the link parameters; and simulating replacement of a number of the reflection sources until the calculated level of the predetermined phenomenon is reduced to less than the predetermined threshold.

2. The method of claim 1, wherein the predetermined phenomenon is MPI.

3. The method of claim 1, wherein the predetermined phenomenon is ORL.

4. The method of claim 1, wherein the predetermined phenomenon is a composite of the MPI and ORL phenomena.

5. The method of claim 1, further comprising:

using an optical time domain reflectometry (OTDR) technique to allow the measuring step to measure the link parameters.

6. The method of claim 1, wherein the simulating and calculating steps include:

simulating removal of exactly one remaining reflection source that is calculated to contribute most to the level of the predetermined phenomenon, so as to update the link parameters;

re calculating the level of the predetermined phenomenon based on the updated link parameters; and iteratively repeating the simulating and re-calculating steps until the level of the predetermined phenomenon is reduced to beneath the predetermined threshold.

7. The method of claim 1, further comprising:

selecting an analytical model of the predetermined phenomenon, for use in the measuring and calculating steps.

8. The method of claim 1, wherein the simulating step includes:

simulating the replacement of the number of the reflection sources at a single wavelength.

9. The method of claim 1, wherein the simulating step includes:

simulating the replacement of the number of the reflection sources at plural wavelengths.

10. A system configured to perform the method of claim 1.

11. A computer readable medium including computer executable code or computer executable instructions that, when executed, causes a computer to perform a method of determining how to reduce to beneath a predetermined threshold, a predetermined phenomenon that is chosen from a group consisting essentially of the MPI, the ORL, and a composite of the MPI and the ORL phenomena, the method comprising:

measuring link parameters of the optical transmission link using an optical reflectometry technique;

calculating a level of the predetermined phenomenon, based on the link parameters; and simulating replacement of a number of the reflection sources until the calculated level of the predetermined phenomenon is reduced to less than the predetermined threshold.

12. A device for determining how to reduce, to beneath a predetermined threshold, a predetermined phenomenon that is chosen from a group consisting essentially of multi path interference (MPI), optical return loss (ORL), and a composite of MPI and ORL phenomena, that may be experienced in an optical transmission link having discrete optical reflection sources that cause the MPI and ORL, the device comprising:

a) a sensing portion configured to receive signals derived from reflected optical signals extracted from the optical transmission link;

b) a processing portion; and c) a storage portion configured to store:

c1) a first storage sub-portion configured to store coded instructions that, when executed by the processing portion, perform an optical reflectometry technique on the signals from the sensing portion; and c2) a second storage sub-portion configured to store coded instructions that, when executed by the processing portion, determine how to reduce the predetermined phenomenon to beneath the predetermined threshold by performing the steps of:

measuring link parameters of the optical transmission link using an optical reflectometry technique;

calculating a level of the predetermined phenomenon, based on the link parameters; and simulating replacement of a number of the reflection sources until the calculated level of the predetermined phenomenon is reduced to less than the predetermined threshold.

13. The device of claim 12, wherein the predetermined phenomenon is MPI.

14. The device of claim 12, wherein the predetermined phenomenon is ORL.

15. The device of claim 12, wherein the predetermined phenomenon is the composite MPI and ORL phenomena.

16. The device of claim 12, wherein:

the sensing portion, processing portion, and storage portion are all contained within a portable optical time domain reflectometry (OTDR) device.

17. The device of claim 16, further comprising at least one of a group consisting essentially of:

a source of optical signals that are injected into the optical transmission link;

an input portion configured to receive inputs from a user of the portable OTDR device;

an output portion configured to provide outputs to the user of the portable OTDR device; and a communications port configured to provide bidirectional communications between the OTDR device and an external apparatus.

18. The device of claim 12, wherein:

the sensing portion, processing portion, and storage portion are all contained within a general purpose computer.

19. The device of claim 12, wherein the simulating and calculating steps include:

simulating removal of exactly one remaining reflection source that is calculated to contribute most to the level of the predetermined phenomenon, so as to update the link parameters;

re calculating the level of the predetermined phenomenon based on the updated link parameters; and iteratively repeating the simulating and re-calculating steps until the level of the predetermined phenomenon is reduced to beneath the predetermined threshold.

\* \* \* \* \*